Sept. 27, 1960  R. N. WALLACE  2,954,049
FLUID CONNECTION THROUGH A PRESSURE SHELL
Filed Feb. 25, 1959
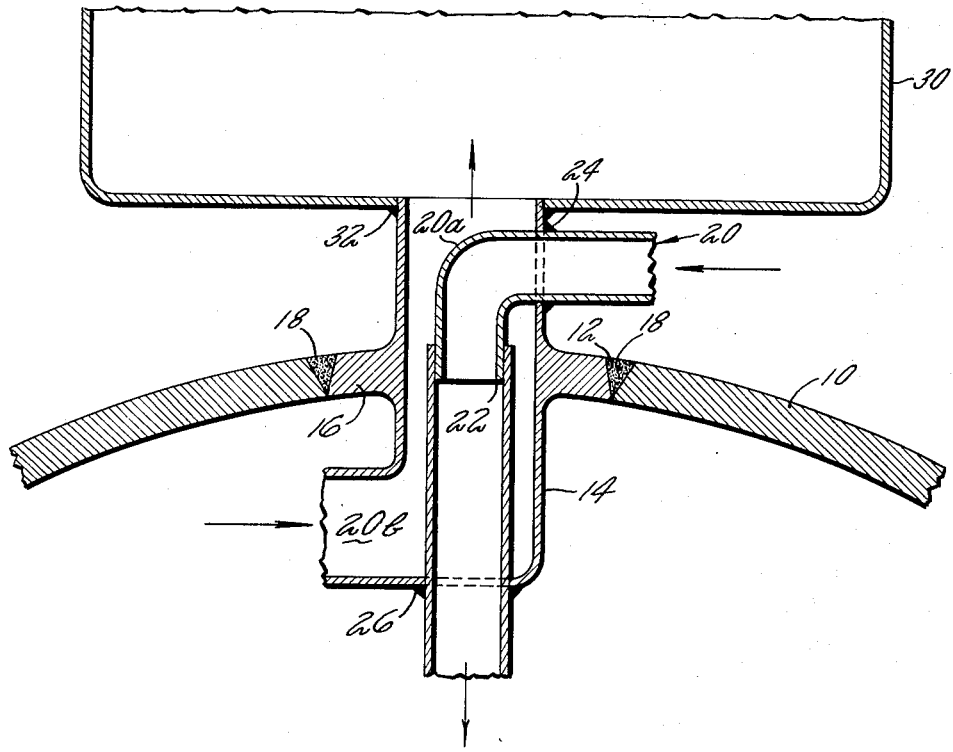
INVENTOR
RUDOLF N. WALLACE
BY  M. B. Tasker
ATTORNEY

United States Patent Office 2,954,049
Patented Sept. 27, 1960

2,954,049

FLUID CONNECTION THROUGH A PRESSURE SHELL

Rudolf N. Wallace, Glastonbury, Conn., assignor to United Aircraft Corporation, East Hartford, Conn., a corporation of Delaware Filed Feb. 25, 1959, Ser. No. 795,531

8 Claims. (Cl. 137—590)

This invention relates to pressure shells having inlet and outlet connections through which fluid at high temperature and pressure is circulated or through which fluid is circulated with large differences in fluid and shell temperatures.

One of the objects of this invention is to keep the number of inlet and outlet connections to such a shell at a minimum and to minimize thermal gradients in the structure.

If the fluid circulates through another device such as a heat exchanger, valve or pump, wherein the temperature or the pressure of the fluid is changed, it is desirable to mount the device on the pressure shell and to support it through a single rigid connection to the shell.

It is a further object of this invention to provide a support for such an external device on the shell which avoids stresses resulting from differential thermal expansion or from deflections between multiple fluid connections.

A still further object of this invention is to provide a pressure shell having an improved construction for mounting a device thereon together with improved fluid inlet and outlet connections.

A further object of this invention is to provide an inlet and outlet construction for a high pressure, high temperature liquid containing shell in which the shell is protected against the high temperature of the entering liquid.

These and other objects and advantages of the invention will be apparent or will be specifically pointed out in connection with one embodiment of the invention shown in the accompanying drawing.

The single figure of the drawing shows a high temperature, high pressure liquid containing shell having the improved liquid inlet and outlet construction of this invention.

In this drawing, 10 represents the shell of a high temperature, high pressure liquid container having a single opening 12 in its shell. A tubular outlet pipe 14 of suitable diameter to substantially completely occupy the full diameter of the opening is welded in a fluid-tight manner in the opening as indicated at 18, with the opposite ends of the pipe extending beyond both the inside and the outside surface of the shell. Preferably, the pipe 14 is provided with an annular boss 16 which matches the shell in thickness for welding purposes and also provides any additional material which may be required for structural reinforcement of the shell opening.

An inlet pipe 20 is provided which is considerably smaller in diameter than pipe 14 and is concentric with pipe 14. Pipe 20 consists of two telescoping parts 20a and 20b which cooperate to provide a slip joint 22 within pipe 14. Part 20a is in the form of an elbow that extends laterally through a side wall of pipe 14 externally of shell 10 and is welded in a fluid-tight manner thereto, as indicated at 24. Part 20b is rigidly supported on the part of pipe 14 that is within shell 10. Herein, the pipe 14 is in the form of an elbow and part 20b extends through a side wall of the elbow to which it is welded, as indicated at 26.

One of the advantages of the inlet-outlet construction of this invention resides in the direct support of the fluid receptacle 30 directly on the outlet pipe. This receptacle, which may be a pump, a cooler, a valve, or a heat exchanger, by having only a single welded connection at 32 to shell 10, avoids many difficulties resulting from differential thermal expansions or deflections which arise when multiple rigid connections exists between the shell 10 and the device 30. This is especially important if the device 30 is one which materially alters the temperature or the pressure of the fluid.

In assembling the device illustrated, the inlet and outlet pipes are first assembled and the welds made at 24 and 26. This assembly is then welded to the shell 10 at 18, after which receptacle 30 is welded to pipe 14.

As a result of the construction of this invention, it will be apparent that an arrangement for the fluid inlet and outlet connections to a high temperature, high pressure shell has been provided which not only requires only a single aperture in the shell, but also prevents many of the usual stresses commonly encountered in a structure of this sort.

The construction of this invention is particularly advantageous where the fluid entering the inlet pipe is at very high temperature. Under these circumstances the cooler fluid leaving through outlet pipe 14 provides pressure support and thermal insulation for the inner pipe.

The provision of the slip joint 22 permits slight axial displacement of one tube with respect to the other which might result from temperature differences between the two.

Under some conditions, for example, when there are large differences in fluid temperature, the fluid flowing outwardly through annular passage A should be the one having the temperature closer to that of the pressure shell.

While only one embodiment of the invention has been shown by way of example, it will be understood that many changes are possible in the construction and arrangement of the parts within the scope of this invention.

I claim:

1. In combination, a pressure shell having an opening therein, an outlet pipe extending through said opening and into said shell, said outlet pipe having a welded connection to said shell at said opening, and an inlet pipe smaller in diameter than said outlet pipe extended through the latter into said shell, said inlet pipe having a welded connection with said outlet pipe both inside and outside of said shell and having a telescoping slip joint therein between said welded connections.

2. In combination, a pressure shell having an opening therein, an outlet pipe extending through said opening and into said shell, said outlet pipe having a fluid-tight welded connection to said shell about said opening, and an inlet pipe smaller in diameter than said outlet pipe extended through the latter in spaced relation to the side walls thereof in the vicinity of said shell wall, said inlet pipe having a welded connection with said outlet pipe both inside and outside of said shell, and an expansion joint in said inlet pipe between said welded connections.

3. In combination, a pressure shell having an opening therein, an outlet pipe extending through said opening and into said shell, said outlet pipe having a fluid-tight peripheral welded connection to said shell about said opening, and an inlet pipe smaller in diameter than said outlet pipe extended through the latter in spaced relation to the side walls thereof in the vicinity of said shell wall, said inlet pipe extending through the side wall of said outlet pipe inside said shell and having a peripheral welded connection to said side wall inside said shell, said inlet pipe also extending through the side wall of said outlet pipe outside said shell and having a fluid-tight peripheral connection to said side wall outside said shell, and an expansion joint in said inlet pipe within said outlet pipe between said welded connections of the latter to said inlet pipe.

4. In combination, a pressure shell having a single opening therein, an outlet pipe extended through said opening and into said shell, said outlet pipe having a peripheral welded connection to said shell at said opening, an inlet pipe concentric with said outlet pipe extended through the latter in spaced relation thereto into said shell, one of said pipes having its end which is within said shell angularly disposed relative to the other pipe, said one pipe having a welded connection to the other pipe at their intersection, a fixed support for the end of said inlet pipe external of said shell, and an expansion joint in said inlet pipe within said outlet pipe.

5. In combination, a pressure shell having a single opening therein, an outlet pipe extended through said opening and projecting beyond said shell both inside and outside of said shell, an inlet pipe concentric with said outlet pipe extended through the the latter in spaced relation thereto into said shell, said inlet pipe extending through a wall of said outlet pipe both inside and outside said shell and having a welded connection with said outlet pipe where it extends through the latter, and a slip joint in said inlet pipe between its two welded connections to said outlet pipe.

6. In combination, a pressure shell having an opening therein, an outlet pipe extended through said opening and welded thereto at said opening, a fluid container supported on the end of said outlet pipe external of said shell, an inlet pipe concentric with said outlet pipe extended through the latter into said shell, said inlet pipe extending through a side wall of said outlet pipe both within and without said shell and having welded connections with said outlet pipe at both side wall intersections, and a slip joint in said inlet pipe between said welded connections.

7. In combination, a pressure shell having a single opening, concentric inlet and outlet pipes extended through said opening, the outermost of said pipes having a welded connection to said shell, said inner pipe having its inner and outer ends extended through the side wall of said outer pipe and welded thereto, and an expansible joint in said inner pipe between its welded connections to said outer pipe.

8. In combination, a pressure shell having an opening, an outlet pipe extended into said shell through said opening having a fluid-tight welded connection to said shell intermediate its ends and projecting both inwardly and outwardly beyond said shell, an inlet pipe of smaller diameter than said outlet pipe extended into said shell within said outlet pipe, said inlet pipe having its outer end extended through a side wall of said outlet pipe externally of said shell and having a fluid-tight welded connection thereto and having its inner end extended through a side wall of said outlet pipe internally of said shell and welded thereto, and an extensible joint in said inlet pipe between said welded connections to said outlet pipe.

References Cited in the file of this patent
UNITED STATES PATENTS

| | | |
|---|---|---|
| 732,122 | Schneider | June 30, 1903 |
| 1,954,597 | Mullen | Apr. 10, 1934 |
| 2,335,595 | Kromer | Nov. 30, 1943 |
| 2,638,916 | Scheiwer | May 19, 1953 |
| 2,845,787 | Fick | Aug. 5, 1958 |